Jan. 7, 1964     D. E. KENYON     3,117,317

DISTANCE MEASURING CIRCUIT

Filed May 25, 1959     2 Sheets-Sheet 1

INVENTOR
DAVID E. KENYON
BY
ATTORNEY

Jan. 7, 1964     D. E. KENYON     3,117,317

DISTANCE MEASURING CIRCUIT

Filed May 25, 1959     2 Sheets-Sheet 2

INVENTOR
DAVID E. KENYON
BY
ATTORNEY

United States Patent Office 3,117,317
Patented Jan. 7, 1964

3,117,317
DISTANCE MEASURING CIRCUIT
David E. Kenyon, Huntington, N.Y., assignor to Sperry Rand Corporation, a corporation of Delaware
Filed May 25, 1959, Ser. No. 815,694
9 Claims. (Cl. 343—13)

The present invention in its broadest aspect is an extremely accurate method of measuring the time interval between the occurrences of two related events, wherein the time of occurrence of the events themselves can be determined with extreme accuracy. The present invention may be readily comprehended if it is explained as it is used in a radar ranging circuit, although it will be obvious to those skilled in the art that its usefulness is not limited to this specific use.

It is sometimes desirable that an area of land be surveyed from a vessel positioned on an adjacent body of water, or from an aircraft flying over the land area. Distance measuring by means of radar is convenient in this instance, but the radar must be capable of providing extremely accurate range information. Most presently used radar systems, however, do not possess the required range precision for use in such a task.

It is therefore an object of this invention to determine with great accuracy the time interval between the occurrence of two events, the events themselves being determinable with considerable accuracy.

It is another object of the present invention to provide a method for accurately determining the distance to a remotely located object.

A further object of this invention is to provide means for counting the number of cycles of an electrical signal at a certain frequency which occur during an extended period of time, wherein the number of cycles counted is equal to the number of cycles of a much higher frequency which occur in a much shorter interval of time.

Another object of this invention is to record the number of repetitive events which occur within a correspondingly repetitive interval of time, the rate at which these events are recorded being continuously under the operator's control without loss of precision in the final count.

These and other objects of the invention, which will become more apparent from the specification and claims below, are achieved in a radar ranging circuit, for example, by providing two sources of electromagnetic signals having respective first and second frequencies, the second frequency being lower than the first frequency, and respective means coupled to said two signal sources for providing third and fourth signals whose frequencies are respectively related to said first and second frequencies by a common multiplying factor. Means are provided for radiating pulses of electromagnetic energy at a repetition frequency equal to, and in phase coincidence with, said first frequency, and means are provided for receiving reflected pulses from objects remotely located from said radiating means. Means are provided for combining said third and fourth signals and deriving a difference frequency signal whose frequency is the difference between said third and fourth signals. Means are provided for counting the number of cycles of said difference frequency signal which occur between the phase coincidence of said two signals at said first and second frequencies and the phase coincidence of said second signal at said second frequency and a received signal reflected from said remotely located object. That is, counting of the difference frequency signal is started when the first and second signals are in phase coincidence, and then the second signal progressively lags in phase behind said first signal but progressively approaches phase coincidence with the received signal. When the second signal and the received signal come into phase coincidence the counting is stopped. Therefore the time of counting is a function of the range of the object and the rate at which the second signal approaches the received signal (difference between the first and second frequencies). However, since the number of difference frequency cycles counted in a given time interval is a function of the common multiplication factor times the difference between the first and second frequencies (third and fourth frequencies), the total number of cycle counted is independent of the difference between the first and second frequency and is a function only of the range of the remotely located object. It will be shown below that the number of cycles counted is equal to the number of cycles of the third frequency which occurs in one pulse interval between the radiation of a pulse and the return of a reflection of that pulse from the remotely located object. This means that the number of pulses counted may be calibrated in terms of range in accordance with the time interval between cycles of said third frequency, and by choosing that frequency to be very high, extremely accurate range information is obtained.

For a fuller understanding of the present invention, reference will be had to the following drawings, wherein.

Figure 1:
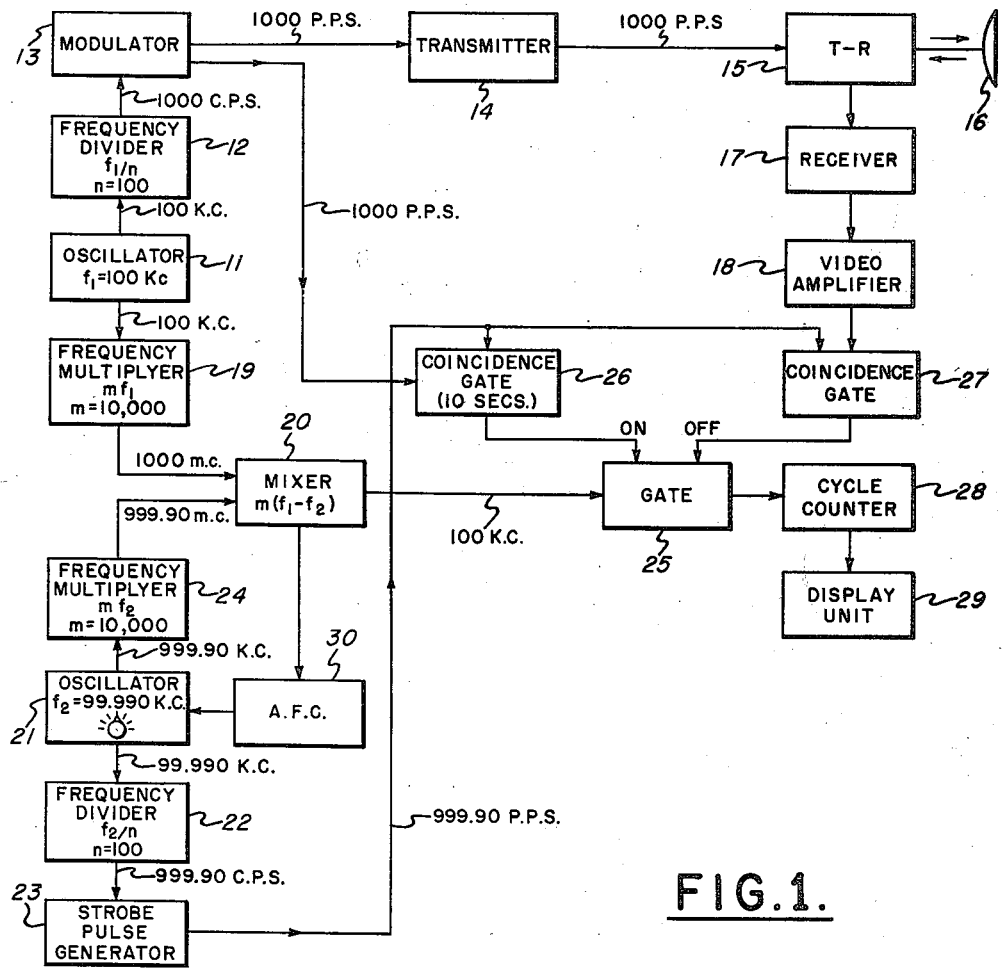
FIG. 1 is a block diagram of a radar ranging circuit constructed to operate in accordance with the present invention.

Referring now more patricularly to FIG. 1, oscillator 11 provides an electrical oscillatory signal at frequency $f_1$ to frequency divider 12. Oscillator 11 is desirably quite stable in frequency and therefore may be crystal controlled oscillator. Frequency divider 12 divides the frequency $f_1$ by a factor $n$, and may be any well known circuit capable of performing this function, such as the circuit disclosed in U.S. Patent 2,365,583. Frequency divider 12 is coupled to modulator 13 which in turn is coupled to transmitter 14. Modulator 13 produces output pulses at a repetition frequency equal to the frequency of its input signal. Transmitter 14 provides pulses of electromagnetic energy at the modulator repetition frequency to antenna means 16 through conventional transmit-receive means 15. Pulses of electromagnetic waves reflected from remotely located objects are received by antenna means 16 and are coupled through transmit-receive means 15 to receiver 17 where they are detected and then amplified in video amplifier 18.

Oscillator 11 is also coupled to frequency multiplier 19 which multiplies the frequency $f_1$ by a factor $m$. Frequency multiplier 19 is coupled to mixer 20.

A second oscillator 21 supplies an electrical oscillatory signal at a frequency $f_2$ which is different from the frequency $f_1$ by a small amount. Oscillator 21 is desirably quite stable in frequency and also may be a crystal controlled oscillator. Oscillator 21 is coupled to frequency divider 22. Frequency dividers 12 and 22 may be identical and each operates to divide the frequency of its respective input signal by the same factor $n$. Frequency divider 22 is coupled to strobe pulse generator 23 which may be similar to modulator 13 and produces output pulses at a repetition frequency equal to the frequency of its input signal. Oscillator 21 is also coupled to frequency multiplier 24 which is similar to frequency multiplier 19. Each of the frequency multipliers 19 and 24 operates to multiply the frequency of its respective input signal by the same factor $m$.

Frequency multipliers 19 and 24 are coupled to mixer 20, a heterodyne circuit, which produces an output signal at a frequency equal to the difference between the frequencies applied at its inputs.

Automatic frequency control means 30 is coupled between mixer 20 and oscillator 21 and provides means for maintaining a constant difference between the frequencies $f_1$ and $f_2$ of oscillators 11 and 21 respectively.

Mixer 20 is coupled through gate 25 to cycle counter 28 which in turn is coupled to display unit 29. Display unit 29 provides a visual display indicating the count in cycle counter 28. An example of a suitable type of counter which may be employed is the Hewlett-Packard model 523.

Modulator 13 and strobe pulse generator 23 are coupled to coincidence gate 26 which provides an output signal to gate 25 each time coincidence occurs between the output pulses of modulator 13 and strobe pulse generator 23. The output signal of coincidence gate 26 operates to turn on gate 25 and thus allows it to pass the difference frequency signal from mixer 20. Video amplifier 18 and strobe pulse generator 23 are coupled to coincidence gate 27 which is similar to coincidence gate 26. Gate 27 provides an output signal to gate 25 each time pulses from video amplifier 18 and strobe pulse generator 23 occur in coincidence. The output signal of coincidence gate 27 operates to turn off gate 25 and thus terminates the counting in cycle counter 28. Therefore, cycle counter 28 will count the number of cycles of the difference frequency signal from mixer 20 which occur during the time interval between the occurrence of an output signal from coincidence gate 26 and the occurrence of an output signal from coincidence gate 27.

In the operation of the ranging circuit illustrated in FIG. 1, oscillator 11 provides an output signal at 100 kilocycles (kc.) per second which is coupled to frequency divider 12. Frequency divider 12 divides the frequency of the input signal by a factor $n$ which is equal to 100. The output signal of frequency divider 12 is therefore a signal having a frequency of 1000 cycles per second (c.p.s.). Modulator 13 operates in response to this signal to produce pulses at a repetition frequency of 1000 pulses per second (p.p.s.) which modulate transmitter 14. Pulses of electromagnetic waves at a repetition frequency of 1000 p.p.s. are coupled from transmitter 14 through transmit-receive means 15 and are radiated into space by antenna means 16. Reflections of these pulses are received by antenna means 16 and are coupled through receiver 17 and video amplifier 18 to coincidence gate 27. The received pulses from video amplifier 18 which are coupled to coincidence gate 27 are at the same repetition frequency as the pulses from modulator 13 and transmitter 14, but are delayed in time from those latter pulses by a time interval which is the round-trip propagation time of the received electromagnetic energy reflected from the remotely located object.

Oscillator 21 provides an output signal at frequency $f_2$ which is here assumed to be 99.990 kc. per second. This signal is divided down in frequency divider 22 by the factor $n$ which is equal to 100, as stated above. The output of frequency divider 22 is a signal at 999.90 c.p.s. which causes strobe pulse generator 23 to produce output pulses at the repetition frequency of 999.90 pulses per second. These pulses are coupled to a respective input terminal of coincidence gates 26 and 27.

Frequency multipliers 19 and 24 operate to multiply the frequency of their respective input signals by the common factor $m$ equal to 10,000, so that their respective output signals are at frequencies of 1,000 megacycles (mc.) and 999.9 mc. These two frequencies are heterodyned in mixer 20 and a signal at the difference frequency of 100 kc. is coupled to gate 25. Gate 25 is normally in the off state and will pass the difference frequency signal from mixer 20 only on command from coincidence gate 26, and will return to the off state only on command from coincidence gate 27.

The two input signals to coincidence gate 26 are the respective series of pulses from modulator 13 and strobe pulse generator 23. These two series of pulses are represented by the first two repetitive series of pulses of FIG. 2. Coincidence gate 26 will produce an output signal to gate 25 only when pulses of its two input signals occur in coincidence. Therefore, with the particular values assumed in this illustrative example it may be seen that coincidence gate 26 will produce an output signal every ten seconds since the repetition frequency of strobe pulse generator 23 is .1 pulse per second slower than the repetition frequency of modulator 13. Thus, at ten second intervals gate 25 will be turnd on and cycle counter 28 will start counting the cycles of the difference frequency signal from mixer 20. By referring to FIGS. 1 and 2 it will be noted that the output signal of coincidence gate 26 and the difference frequency signal from mixer 20 inherently will be in phase coherence because the output of coincidence gate 26 occurs at the instant that a pulse from modulator 13 occurs at the instant of the difference frequency signal will commence at the instant that a cycle of the signal from frequency multiplier 19 commences. Because frequency multiplier 19 and modulator 13 are both coupled to, and operate in response to, oscillator 11, their respective output signals will be in phase coherence with the output of oscillator 11, and it follows that the output of coincidence gate 26 and the output of mixer 20 will be in phase coherence.

Figure 2:
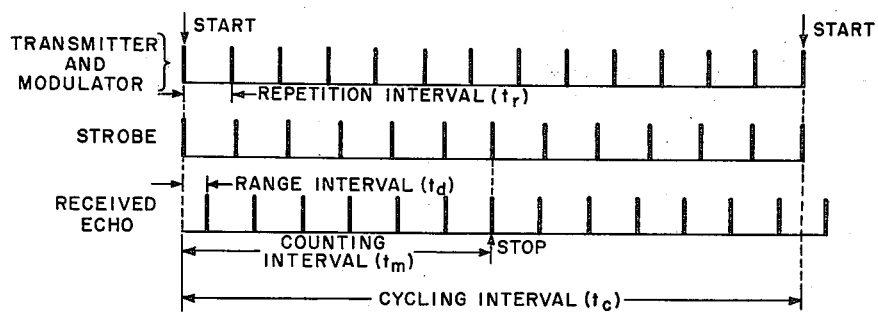
FIG. 2 is a series of waveforms used in explaining the operation of the circuit of FIG. 1.

Because the repetition frequency of the strobe pulse generator 23 is slower than the repetition frequency of modulator 13 the successively occurring strobe pulses from strobe pulse generator 23 will lag progressively further and further behind the successively occurring modulator pulses from modulator 13. This may be seen in FIG. 2 wherein the first modulator pulse and the first strobe pulse are in coincidence but the successive strobe pulses occur progressively later with respect to the successively occurring modulator pulses. As the strobe pulses progressively occur later and later with respect to the modulator pulses they will progressively approach the time of occurrence of the received echo pulses which occur some time between the pulse interval of the transmitter (modulator) pulses. The strobe pulses will progressively lag behind the modulator pulses until a strobe pulse and a received echo pulse are in time coincidence. Coincidence gate 27 detects this coincidence and produces an output signal in response thereto which turns off gate 25, and thus blocks the difference frequency signal from reaching the cycle counter 28, thus stopping its counting action. It may therefore be seen that the counting interval of cycle counter 28 is the time interval between the coincidence of a strobe pulse and a modulated pulse and the coincidence of a strobe pulse and a received pulse, as indicated in FIG. 2. The total count in cycle counter 28 will therefore be equal to the product of the difference frequency signal and the time during which gate 25 passes said signal.

The significance of the operation just described and the results achieved thereby, will now be investigated. In FIG. 2 it may be seen that the "range interval" $t_d$ bears the same relationship to the repetition interval $t_r$ as the "counting interval" $t_m$ bears to the "cycling interval" $t_c$, wherein the cycling interval $t_c$ is the time interval between two coincidences of the modulator and strobe pulses. This relationship may be expressed as, $$\frac{t_m}{t_c}=\frac{t_d}{t_r} \quad (1)$$

That the above is true is obvious from the example illustrated in FIG. 2, wherein received echo pulses are represented as occurring midway in the repetition interval. If it takes a cycling interval for a strobe pulse to again come into coincidence with a modulator pulse it will take just half that time for a strobe pulse to come into coincidence with a received echo pulse which is midway between the modulator pulses. This illustrates that the counting interval is directly proportional to range, and that the total count in counter 28 is directly proportional to range.

A further development of Equation 1 will reveal two significant facts which occur as a result of the mode of operation of the above-described circuit. These facts are, (1) the total number of cycles counted in counter 28 is independent of the difference in frequency between oscillators 11 and 21, i.e., the count in counter 28 is independent of the difference frequency signal $m(f_1-f_2)$ from mixer 20; and, (2) the total number of cycles counted is numerically equal to the number of cycles of the signal at frequency $mf_1$ from multiplier 19 which occur during one range interval $t_d$. This further development may be carried out as follows:

Equation 1 may be rewritten as, $$t_m = \frac{t_c t_d}{t_r} \quad (2)$$

by definition, $$t_c = \frac{n}{f_1 - f_2} \quad (3)$$

and, $$t_r = \frac{n}{f_1} \quad (4)$$

Substituting Equations 3 and 4 into Equation 2 produces, $$t_m = \frac{t_d f_1}{f_1 - f_2} \quad (5)$$

The total number of cycles of the difference frequency signal $m(f_1-f_2)$ counted during a counting interval $t_m$ is equal to, $$T = t_m m(f_1 - f_2) \quad (6)$$

and substituting the expression for $t_m$ of Equation 5 for $t_m$ of Equation 6 produces, $$T = t_d m f_1 \quad (7)$$

In terms of practical considerations, Equation 7 demonstrates that if oscillator 11 is highly stable in frequency, as previously assumed, it is possible for the frequency $f_2$ of oscillator 21 to vary with respect to frequency $f_1$ without affecting the count in counter 28. This is evident from the above-development since the term $(f_1-f_2)$ cancels out in deriving Equation 7 from Equations 5 and 6.

It has been shown previously that the total count in cycle counter 28 is directly proportional to range, therefore in terms of range information, Equation 7 indicates that for a given range to the remotely located object, each cycle of the signal at frequency $mf_1$ which occurs during the range interval $t_d$ corresponds to an incremental distance in range. Therefore, by choosing the frequency $mf_1$ to be very high, the number of cycles of frequency $mf_1$ which occur in a given range interval will be very high and each cycle will represent a very small range increment, with the result that the resolution of the ranging system may be extremely precise.

It may now be seen that in the discussion of FIGS. 1 and 2 above, wherein a range interval of 500 microseconds was assumed and the frequency $mf_1$ was assumed to be 1000 mc. per second, the total number of cycles counted in counter 28 would be 500,000 (see Equation 7). Each cycle counted would represent 1/1000 microseconds, or an incremental range distance of approximately one-half of a foot. However, because the counter 28 may stop counting some time during the interim of a cycle of the signal at frequency $mf_1$, the system is accurate only to within a count of ±1 cycle, which is approximately one-half a foot. Therefore, with the frequencies and range interval assumed above, the system described would have a theoretical range precision of approximately one foot.

An important advantage to be gained by the present invention operating in the manner described is that the theoretical precision of the ranging system is directly tied to the frequency $mf_1$ of frequency multiplier 19, which may be chosen quite high and above the capabilities of any presently known cycle counters, while the actual counting is at the rate $m(f_1-f_2)$ which may be chosen low enough to be well within the capabilities of presently available counters. The theoretical precision of the system may be further increased by inserting a frequency multiplier between gate 25 and counter 28 of FIG. 1. For example, if a frequency multiplier having a multiplication factor of two were inserted between gate 25 and cycle counter 28, each cycle counted would represent an incremental range distance of approximately one-quarter of a foot.

The accuracy of the system will be affected by the steepness of the leading edges of the received echo pulses and of the pulses from modulator 13 and strobe pulse generator 23. Therefore the bandwidth of all circuits passing these pulses should be as wide as possible. For a theoretical accuracy of one-half a foot a bandwidth of approximately 100 mc. is required.

Figure 3:
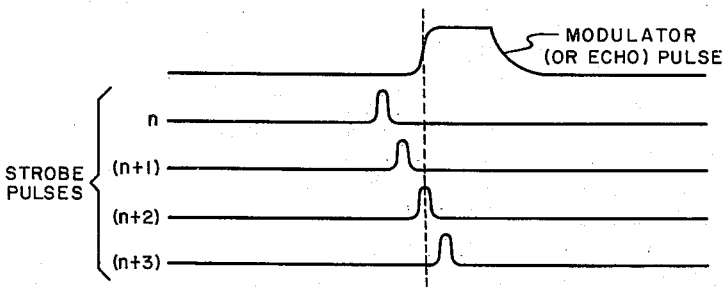
FIG. 3 is a series of waveforms used in explaining a particular feature of the present invention.

The accuracy of the system also will be affected by the rate at which the strobe pulses approach the modulator pulses and the received echo pulses, and this rate is proportional to the difference between the frequencies $f_1$ and $f_2$ of oscillators 11 and 21. The slower the rate at which the strobe pulses approach the modulator and the return echo pulses (the smaller the difference between $f_1$ and $f_2$), the greater the accuracy of the system. That is, it should be assured that the strobe pulse will first coincide with a modulator pulse and with a received echo pulse near the respective leading edges of those pulses. This is illustrated in FIG. 3 which illustrates the relative time of occurrence of successively occurring strobe pulses with respect to successively occurring modulator pulses. Because the times of occurrence of the successively occurring strobe pulses progressively change with respect to the times of occurrence of successively occurring modulator pulses, the modulator pulses are represented by a single fixed reference pulse and the strobe pulses are represented as moving with respect to this reference pulse. It will be seen that the $n$th strobe pulse and the $(n+1)$ strobe pulse are not in coincidence with the modulator pulse but that the $(n+2)$ strobe pulse is in coincidence with the modulator pulse along its leading edge. By assuring that the strobe pulses approach the modulator pulse at a slow rate (difference between frequencies $f_1$ and $f_2$ is small), as illustrated in FIG. 3, it will be assured that a strobe pulse will first go into coincidence with the modulator pulse very near the leading edge of that modulator pulse. The time of coincidence between the $(n+3)$ strobe pulse and subsequent strobe pulses with the modulator pulse will be of no consequence since the counter will be already counting.

The above discussion suggests that a ranging circuit constructed according to the present invention may be operated to obtain "coarse" or "fine" range indications. That is, a "coarse" range indication may be obtained by choosing the difference between the frequencies $f_1$ and $f_2$ to be quite large in which case the total cycles of difference frequency signal will be counted in a short time since the strobe pulse moves at a fast rate with respect to modulator and received echo pulses (FIG. 2). However, because the strobe pulses move at a fast rate the possibility is increased that a strobe pulse may not come into coincidence with a modulator pulse and a received echo pulse within one pulse interval (fast moving strobe pulse may "jump over" a modulator or received echo pulse and a coincidence circuit will not be actuated), so that no significant count will be recorded. After getting a "coarse" indication of range in the manner described, the frequency of oscillator 21 may be increased until the difference between frequencies $f_1$ and $f_2$ is relatively small. Now the strobe pulses will approach the modulator pulses and received echo pulses at a slow rate, and although the counting time may be appreciably increased, the accuracy of the system is also appreciably increased.

It is also possible to cover the interim portion of a counting cycle at a fast rate then slow the counter down as the coarsely determined targe range is approached. No accuracy will be lost if the start and stop of the counting cycle are done at a slow counting rate.

Figure 4:
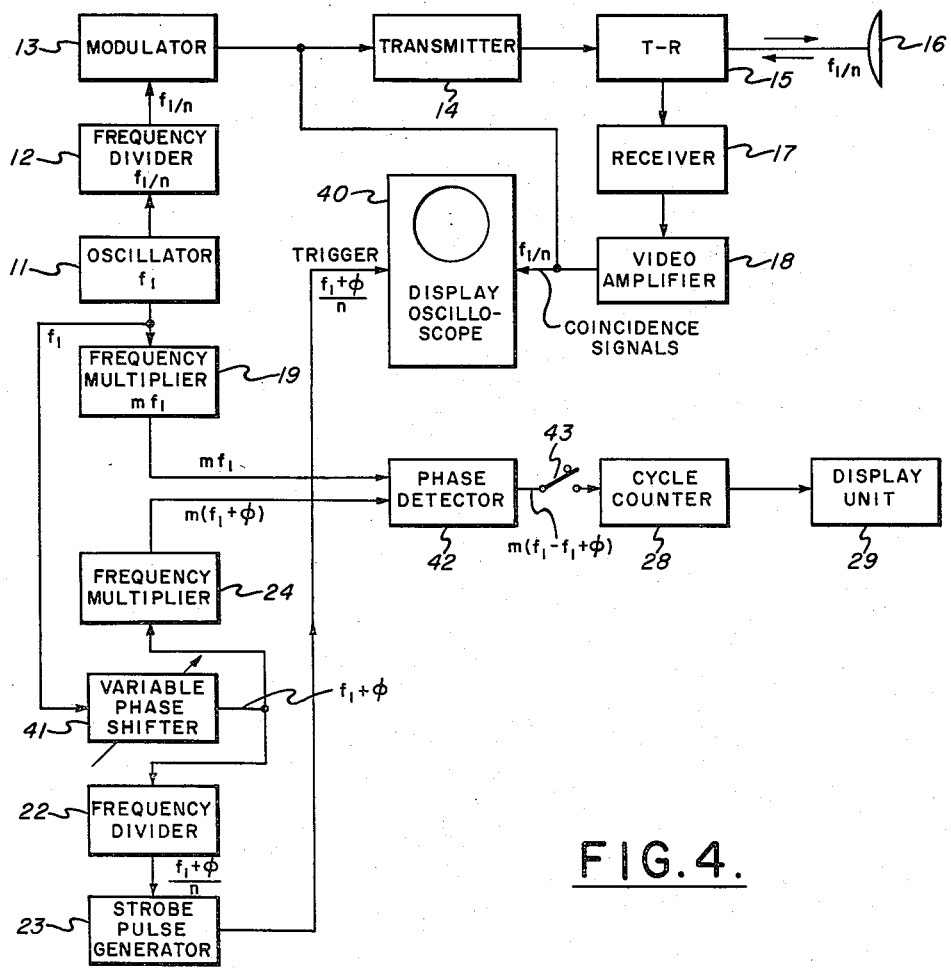
FIG. 4 is a block diagram of an alternative embodiment of a ranging circuit constructed in accordance with the present invention.

An alternative embodiment of a ranging circuit wherein the cycle counting operation may be controlled manually, but still in accordance with the principles of the present invention, is illustrated in the block diagram of FIG. 4. The circuit of FIG. 4 is quite similar to the circuit of FIG. 1 except that in the place of oscillator 21 at frequency $f_2$, a variable phase shifter 41 is coupled to receive the output signal at frequency $f_1$ from oscillator 11. In the place of coincidence circuits 26 and 27 of FIG. 1, a cathode ray oscilloscope 40 is coupled to receive the respective repetitive pulses from modulator 13, video amplifier 18, and strobe pulse generator 23. Mixer 20 of FIG. 1 is replaced by a phase-sensitive detector 42, and finally, a manually operable switching means 43 is added between phase detector 42 and cycle counter 28.

Phase detector 42 may be any known phase-sensitive detector which produces an output signal which varies in magnitude in accordance with the relative phase displacement of two signals applied at its input. An example of such a circuit is the circuit illustrated in FIG. 14.14 in "Waveforms," by Chance et al., published by McGraw-Hill Co., Inc., 1949.

The operations of the embodiments of FIGS. 1 and 4 differ in that in FIG. 1 the counting operation of cycle counter 28 is automatically controlled by coincidence gates 26 and 27, while in the embodiment of FIG. 4 the coincidences of a strobe pulse with a modulator pulse and with a received echo pulse is viewed on the screen of cathode ray oscilloscope 40. A strobe pulse may be brought into coincidence with a modulator pulse and then with a received echo pulse, see FIG. 2, by varying phase shifter 41 so as to produce an increasing phase delay of its output signal with respect to the signal at frequency $f_1$ applied to its input. This operation is the same as the operation of the embodiment of FIG. 1 in this respect since a continuous phase change is in fact a change in frequency. Therefore, a continuous phase change in the signal $f_1+\phi$ produced by phase shifter 41 is equivalent to the signal at frequency $f_2$ produced by oscillator 21 in FIG. 1.

When it is determined that a strobe pulse and a modulator pulse are in coincidence on the screen of oscilloscope 40, see FIG. 2, the operator closes switch 43 and cycle counter 28 commences to count the cycles of the output signal from phase detector 42. The operator will then continue to increase the phase delay of the output signal from phase shifter 41 so that a strobe pulse will approach coincidence with a received echo pulse on the screen of oscilloscope 40. When it is determined that a strobe pulse and a received echo pulse are in coincidence on the screen of oscilloscope 40, the operator opens switch 43 and stops the counting in cycle counter 28. The total count in cycle counter 28 will be the same as it would be in the embodiment of FIG. 1, for a target at a given distance.

The period of the cycling interval, that is, the frequency of the output signal $f_1+\phi$ from phase detector 42, may be controlled by the operator by varying the rate of change of the phase shift $\phi$ produced by phase shifter 41. Several suitable types of variable phase shifters are described in the above-referenced text "Waveforms."

Thus the operator may readily make a "coarse" range determination by causing the phase of the output signal of phase shifter 41 to change at a rapid rate, or he may make a "fine" range determination by causing the phase of the output signal of phase shifter 41 to change at a slow rate.

Although the present invention has been described in relation to a radar ranging circuit, it also may be employed in other distance or time measuring applications; a Loran distance measuring system being but one specific example of another possible application.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Measuring apparatus comprising first and second means for providing electrical signals at respective first and second frequencies of different values, means coupled to said first electrical signal means for modulating a source of electromagnetic energy at said first frequency, means for transmitting said modulated electromagnetic energy, receiving means for receiving reflections of said transmitted electromagnetic energy, third and fourth electrical signal means respectively coupled to said first and second electrical signal means for providing corresponding signals at third and fourth frequencies which are respectively related by a common multiplication factor to said first and second frequencies, frequency converting means coupled to said third and fourth electrical signal means for providing electrical signals at a frequency substantially equal to the difference between said third and fourth frequencies, gating means coupled to said frequency converting means and operable in response to on and off signals to pass signals at said difference frequency during the interval between said on and off signals, means having input terminals respectively coupled to said first and second electrical signal means and having an output terminal coupled to said gating means to produce an on signal each time said first and second frequencies are in phase coincidence, means having input terminals respectively coupled to said second electrical signal means and to said receiving means and having an output terminal coupled to said gating means to provide an off signal each time its input signals are in phase coincidence, and means for indicating the number of cycles of said difference frequency signal passed by said gating means.

2. Distance measuring apparatus comprising first and second means for producing electrical signals at respective first and second frequencies of different values, first and second frequency dividing means respectively coupled to said first and second signal producing means for providing respective third and fourth signals whose frequencies are respectively related to said first and second frequencies by a common factor, means coupled to said first frequency dividing means and operating in response thereto for radiating pulses of energy at a repetition frequency substantially equal to the divided first frequency, receiving means for receiving reflected pulses of said radiated energy, frequency converting means coupled to said first and second signal producing means for producing electrical signals at a frequency substantially equal to the difference between said first and second frequencies, first coincidence means having input terminals coupled to said first and second frequency dividing means and adapted to produce an output signal each time said third and fourth signals are in phase coincidence, second coincidence means having input terminals coupled to said second frequency dividing means and to said receiving means and adapted to produce an output signal only when signals on its respective input terminals are in phase coincidence, gating means coupled to said frequency converting means and to said two coincidence means and adapted to be opened by a signal from said first coincidence means and to be closed by a signal from said second coincidence means, whereby electrical signals at said difference frequency are passed by said gating means during the time between the phase coincidence of said third and fourth signals and the phase coincidence of said third signal and said received pulses, and means for indicating the number of cycles of said difference frequency signal passed by said gating means.

3. Measuring apparatus comprising first and second means for providing electrical signals at respective first and second frequencies of different values, respective pulse producing means coupled to each one of said signal providing means for producing first and second series of pulses at repetition frequencies respectively equal to said first and second frequencies, means coupled to the first of said pulse producing means for radiating pulses of energy at said first repetition frequency, receiving means for receiving reflections of said radiated pulses, first and second frequency multiplying means respectively coupled to said first and second signal providing means for providing third and fourth electrical signals having respective frequencies related to said first and second frequencies by a common multiplication factor, difference frequency generating means coupled to said two frequency multiplying means for providing an output signal at a frequency equal to the difference between the frequencies of said third and fourth signals, first coincidence means coupled to said two pulse producing means for producing a start pulse each time pulses of said first and second series of pulses occur in coincidence, second coincidence means coupled to said second pulse producing means and to said receiving means for producing a stop pulse each time a pulse of said second series of pulses and a pulse from said receiving means occurs in coincidence, and counting means coupled to said difference frequency generating means and to said two coincidence means and operable in response to said start and stop signals to count the number of cycles of said difference frequency signal which occur during the interval between said start and stop signals.

4. The combination comprising first and second electrical signal means providing respective electrical signals at first and second different frequencies, means for producing a signal having a third frequency which is a submultiple of said first frequency, means for producing a signal having a fourth frequency which is the same submultiple of said second frequency, receiving means for receiving a signal at said third frequency but time displaced with respect to the first one of said signals at the third frequency, frequency converting means coupled to said first and second electrical signal means for producing an output signal at a frequency equal to the difference between said first and second frequencies, counting means coupled to said frequency converting means and operable in response to the application of start and stop signals thereto to count the number of cycles of said difference frequency signal which occur during the interval between said start and stop signals, means coupled to receive the first one of said signals at said third frequency and said signal at said fourth frequency and coupled to said indicating means for providing a start signal to said counting means each time said signals at said third and fourth frequencies are in phase coincidence, and means coupled to receive said signal at said fourth frequency and said time displaced received signal at said third frequency for providing a stop signal to said counting means each time said time displaced received signal and said signal at said fourth frequency are in phase coincidence.

5. Apparatus for determining the time relationship between first and second repetitive electrical signals each having a first repetition frequency comprising means for generating a first oscillatory electrical signal at a frequency of oscillation substantially higher than said first repetition frequency, means for generating a third repetitive electrical signal at a second repetition frequency lower than said first repetition frequency, means for generating a second oscillatory electrical signal having a frequency related to said second repetition frequency by the same factor which relates the frequency of said first oscillatory signal to said first repetition frequency, means for heterodyning said first and second oscillatory signals to derive a signal at a frequency equal to the difference between the frequencies of said first and second oscillatory signals, means coupled to said heterodyning means for counting cycles of said difference frequency signal, means coupled to receive said first and said third repetitive signals for providing a signal to start said counting means each time said first and third repetitive signals are in coincidence, and means coupled to receive said second and said third repetitive signals for providing a signal to stop the cycle counting in said counting means each time said second and said third repetitive signals are in coincidence.

6. Apparatus for determining the time relationship between first and second repetitive electrical signals each having a first repetition frequency comprising means for generating a first oscillatory signal at a frequency of oscillation substantially higher than said first repetition frequency, means for generating a third repetitive signal at a second repetition frequency different from said first repetition frequency, means for generating a second oscillatory electrical signal having a frequency related to said second repetition frequency by the same factor which relates the frequency of said first oscillatory signal to said first repetition frequency, means for combining said first and second oscillatory signals to derive a signal at a frequency equal to the difference between the frequencies of said first and second oscillatory signals, means coupled to said combining means for counting cycles of said difference frequency signal, means coupled to receive said first, said second and said third repetitive signals for determining when said third repetitive signal is in coincidence with said first repetitive signal and in coincidence with said second repetitive signal, and means to actuate said counting means when said first and third repetitive signals are in coincidence and to stop the operation of said counting means when said second and third repetitive signals are in coincidence.

7. Means for determining the time relationship between first and second repetitive electrical signals each having a first repetition frequency comprising means for generating a first oscillatory electrical signal at a frequency of oscillation substantially higher than said first repetition frequency, means for generating a third repetitive electrical signal at a second repetition frequency lower than said first repetition frequency, means for generating a second oscillatory electrical signal having a frequency related to said second repetition frequency by the same factor which relates the frequency of said first oscillatory signal to said first repetition frequency, means for combining said first and second oscillatory signals to derive a signal at a frequency equal to the difference between the frequencies of said first and second oscillatory signals, means coupled to receive said first, said second and said third repetitive signals for determining when said first and third repetitive signals are in coincidence and for determining when said second and said third repetitive signals are in coincidence, and means coupled to said combining means to count the number of cycles of said difference frequency signals which occur during the interval of time between the respective coincidences of said third repetitive signal with said first and with said second repetitive signals.

8. The combination as claimed in claim 7 wherein the means for generating said third repetitive signal is a variable phase shifting means coupled to receive said first repetitive signal and adapted to produce an output signal whose phase may be continuously varied with respect to the phase of said first repetitive signal.

9. Apparatus for determining the time relationship between first and second series of pulses having substantially the same first repetition frequency comprising means for producing a third series of pulses at a second repetition frequency different from said first repetition frequency, first signal means for producing signals at a frequency which is a multiple of said first repetition frequency, second signal means for producing signals at a frequency which is the same multiple of said second repetition frequency, frequency converting means coupled to said two signal means and operating in response thereto for producing an output signal at a frequency equal to the difference in frequency between said two signals coupled thereto, indicating means coupled to said frequency converting means and operable upon activation to indicate the number of cycles of said difference frequency signal which occur during a period of activation, means coupled to receive said first, said second and said third series of pulses and operable in response thereto for determining when pulses of said first and third series of pulses occur in coincidence and for determining when pulses of said second and third series of pulses occur in coincidence, and means for activating said indicating means when pulses of said first and third series of pulses occur in coincidence and for stopping said indicating means when pulses of said second and third series of pulses occur in coincidence, whereby said indicating means provides an indication of the number of cycles of said difference frequency signal which occur during its period of activation.

References Cited in the file of this patent

UNITED STATES PATENTS

| | | |
|---|---|---|
| 2,532,221 | Bradley | Nov. 28, 1950 |
| 2,568,926 | Moran | Sept. 25, 1951 |
| 2,665,410 | Burbeck | Jan. 5, 1954 |
| 2,717,358 | Munster | Sept. 6, 1955 |
| 2,738,461 | Burbeck et al. | Mar. 13, 1956 |